US009624851B2

(12) United States Patent
Dailly et al.

(10) Patent No.: US 9,624,851 B2
(45) Date of Patent: Apr. 18, 2017

(54) METHOD OF OPERATING A VEHICLE POWERTRAIN HAVING A GAS PHASE FUELABLE ENGINE

(71) Applicant: GM GLOBAL TECHNOLOGY OPERATIONS LLC, Detroit, MI (US)

(72) Inventors: Anne M. Dailly, West Bloomfield, MI (US); Jose Franca, Ortonville, MI (US); Mei Cai, Bloomfield Hills, MI (US); Arianna T. Morales, Royal Oak, MI (US); Mahmoud H. Abd Elhamid, Troy, MI (US); Robert Lee Girdwood, Dansville, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 101 days.

(21) Appl. No.: 14/614,386

(22) Filed: Feb. 4, 2015

(65) Prior Publication Data

US 2015/0226139 A1     Aug. 13, 2015

Related U.S. Application Data

(60) Provisional application No. 61/939,112, filed on Feb. 12, 2014.

(51) Int. Cl.
*F02D 41/00* (2006.01)
*B60W 30/182* (2012.01)
(Continued)

(52) U.S. Cl.
CPC ......... *F02D 41/0025* (2013.01); *B60W 10/06* (2013.01); *B60W 10/08* (2013.01);
(Continued)

(58) Field of Classification Search
CPC ............. F02D 41/0025; F02D 41/0027; F02D 19/061; F02D 19/0615; F02D 19/0647;
(Continued)

(56) References Cited

U.S. PATENT DOCUMENTS

| 7,546,834 B1 * | 6/2009 | Ulrey et al. | ........ F02D 19/0628 123/525 |
| 8,342,158 B2 * | 1/2013 | Ulrey et al. | ........ F02D 19/0694 123/431 |

(Continued)

FOREIGN PATENT DOCUMENTS

| WO | WO 00/41906 | 7/2000 |
| WO | WO 2013/130401 | 9/2013 |

*Primary Examiner* — Todd Melton
(74) *Attorney, Agent, or Firm* — Dierker & Kavanaugh, P.C.

(57) ABSTRACT

A method of operating a vehicle powertrain includes determining a selected powertrain operational mode. A demand fraction is determined. An internal combustion engine (ICE) is to output a maximum power when a gaseous fuel is conveyed to an injector of the ICE at a source pressure greater than a cutoff pressure. The source pressure in a container in fluid connection with the injector is determined. The gaseous fuel is received at the source pressure by the injector to inject the gaseous fuel into the ICE for combustion in response to the source pressure, demand fraction, or selected powertrain operation mode meeting a first set of criteria. The injector is prevented from injecting the gaseous fuel into the ICE and the powertrain is driven from an alternative power source in response to the source pressure, demand fraction, or selected powertrain operation mode meeting a second set of criteria.

14 Claims, 9 Drawing Sheets

(51) Int. Cl.
  *B60W 10/08* (2006.01)
  *B60W 20/00* (2016.01)
  *B60W 10/06* (2006.01)
  *F02D 19/06* (2006.01)
  *F02D 29/02* (2006.01)
  *B60W 20/15* (2016.01)

(52) U.S. Cl.
  CPC .......... *B60W 20/15* (2016.01); *B60W 30/182* (2013.01); *F02D 19/061* (2013.01); *F02D 19/0615* (2013.01); *F02D 19/0647* (2013.01); *F02D 19/0692* (2013.01); *F02D 29/02* (2013.01); *F02D 41/0027* (2013.01); *F02D 2200/0602* (2013.01); *F02D 2200/604* (2013.01); *F02D 2200/606* (2013.01); *Y02T 10/36* (2013.01); *Y10S 903/93* (2013.01)

(58) Field of Classification Search
  CPC .... F02D 19/0692; F02D 29/02; B60W 20/15; B60W 10/06; B60W 10/08; B60W 30/182
  See application file for complete search history.

(56) References Cited

U.S. PATENT DOCUMENTS

| | | | |
|---|---|---|---|
| 9,328,677 B2* | 5/2016 | Leone et al. | ........ F02D 41/0027 |
| 2002/0185086 A1 | 12/2002 | Newman et al. | |
| 2011/0029177 A1* | 2/2011 | Yeung et al. | .......... B60K 6/442 701/22 |
| 2011/0144889 A1* | 6/2011 | Foerster et al. | .... F02D 41/0027 701/103 |
| 2014/0026868 A1 | 1/2014 | Dolan et al. | |
| 2014/0366840 A1* | 12/2014 | Sivasubramanian et al. | ................... F02D 41/0025 123/399 |

* cited by examiner

METHOD OF OPERATING A VEHICLE POWERTRAIN HAVING A GAS PHASE FUELABLE ENGINE

CROSS-REFERENCE TO RELATED APPLICATION

This application claims the benefit of U.S. provisional application Ser. No. 61/939,112, filed Feb. 12, 2014, the contents of which is incorporated by reference herein.

BACKGROUND

Multi-fuel engines are capable of operating on multiple fuel types. For example, bi-fuel engines are capable of operating on two different fuel types. One fuel type may be a liquid phase fuel including gasoline, ethanol, bio-diesel, diesel fuel or combinations thereof that are delivered to the bi-fuel engine substantially in a liquid state. The other fuel type may include, e.g., Compressed Natural Gas (CNG), Liquefied Petroleum Gas (LPG), hydrogen, other gaseous fuels, etc. The two different fuels are stored in separate tanks, and the bi-fuel engine may run on one fuel at a time, or may alternatively run on a combination of the two different fuel types. A hybrid vehicle is a vehicle that uses two or more different power sources to operate the vehicle. For example, hybrid electric vehicles (HEVs) combine an internal combustion (IC) engine and one or more electric motors. In some HEVs, the IC engine and the electric motor are both mechanically connected to the drivetrain to turn the wheels. In other HEVs, the IC engine turns a generator connected to the electric motor, and the IC engine is not mechanically connected to the drivetrain for turning the wheels.

SUMMARY

A method of operating a vehicle powertrain includes determining a demand fraction of a maximum powertrain power of the vehicle powertrain including an internal combustion (IC) engine, the IC engine having a maximum output power when a gas phase fuel is conveyed to a gas fuel injector of the IC engine at a source pressure greater than a cutoff pressure. The method further includes determining a gas phase fuel pressure in a fuel container in fluid connection with a gas fuel injector of the IC engine. If the demand fraction is below a predetermined threshold and the pressure in the fuel container is between a minimum pressure and the cutoff pressure, the gas phase fuel at the gas phase fuel pressure is received at the gas fuel injector to inject the gas phase fuel into the IC engine for combustion. Otherwise, the gas fuel injector is prevented from injecting the gas phase fuel into the IC engine, and the powertrain is driven from an alternative power source.

BRIEF DESCRIPTION OF THE DRAWINGS

Features and advantages of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

The present disclosure includes an engine control module algorithm and fuel system to prioritize the use of gaseous fuel such as Natural Gas (NG) to run a vehicle under low engine demands/loads. The present disclosure further includes a method and vehicle system to use natural gas fuel for simultaneous combustion with a liquid fuel to use substantially all of the natural gas stored onboard the vehicle and thereby extend the driving range of the vehicle compared to vehicles that do not use natural gas below a certain pressure. It is to be understood that examples of the present disclosure are suitable for use at any service pressure, and can be implemented with or without a NG adsorbent operatively disposed in the CNG tank/container.

In an example, the method utilizes natural gas available at pressures between a cut off pressure and a minimum pressure (that heretofore had been left unused). The cut off pressure, leading to the automatic switch from natural gas to an alternate fuel (e.g., gasoline, diesel, etc.), on a bi-fuel vehicle (or to electrical power on a hybrid vehicle) is generally set to relatively high values in order to satisfy the high engine demands and desired vehicle performance. As one example, on a bi-fuel truck, the cut off pressure may be set at 400 psi, which is about one-ninth of the total pressure of the high pressure type 3 tank (3600 psi service pressure). Further, if the bi-fuel truck in the example has a low pressure tank (700-750 psi service pressure), a 400 psi cut off pressure accounts for more than half of the total pressure.

It is to be understood that the cut off pressure is generally determined with regard to the maximum output power of the engine. Output power means an amount of energy output per unit time. Since there is a physical law of conservation of energy, the output power out of the engine is limited to the rate of energy supplied to the engine. Most of the energy supplied to a natural gas engine is in the form of chemical energy stored in the natural gas that is released by combustion in the engine. The amount of chemical energy available is directly proportional to the available mass of the natural gas. Therefore, the rate of energy supplied to the engine is directly proportional to the mass flow rate of natural gas to the engine.

In examples of the present disclosure, the maximum mass flow rate of the natural gas to the engine is related to the pressure of the natural gas supplied to the gas fuel injector. Since the gas fuel injector has a maximum volume of natural gas that can be delivered per combustion cycle of the engine, the pressure of the natural gas in the fuel rail that feeds into the gas fuel injector determines the maximum mass of fuel injected into the cylinder per combustion cycle (assuming that the temperature of the natural gas in the fuel rail does not vary substantially). Although reference is made to the gas fuel injector in the singular form, it is to be understood that a plurality of gas fuel injectors may be used. In an example of the present disclosure, the pressure of the natural gas in the fuel rail is about the same as the pressure in the natural gas tank. As such, the maximum output power of the engine is related to the pressure of the natural gas in the natural gas container. As used herein, the cut-off pressure is the pressure in the natural gas container that will feed the engine with natural gas at a sufficient mass flow rate to achieve the maximum output power of the engine. In some existing bi-fuel engines, the natural gas remaining in the natural gas container is not used after the pressure in the natural gas container has diminished below the cut-off pressure.

In sharp contrast, however, in an example of the present disclosure, natural gas may be used below the cut-off pressure when low power is demanded from the engine. A vehicle may be operated at less than the maximum output power of the natural gas engine for a substantial fraction of the vehicle's typical use pattern. Using the portion of natural gas remaining in the natural gas container below the cut-off pressure allows the vehicle to extend the distance that the vehicle can be driven without refueling.

In another example of the present disclosure, liquid fuel may be combined with the natural gas for simultaneous combustion. If the power demanded from the engine is more than can be produced with low pressure natural gas, the output power of the engine can be increased by adding liquid fuel for simultaneous combustion with the natural gas. As used herein, simultaneous combustion means at least a portion of the natural gas in a combustion chamber combusts at the same time as at least a portion of the liquid fuel combusts in the same combustion chamber. As such, initiation of combustion may occur in one of the fuels in the combustion chamber prior to initiation of combustion in the other fuel in the combustion chamber as long as combustion of at least a portion of each fuel temporally overlaps.

In an example, the maximum output power of the engine may be greater for 100 percent gasoline than a mixture of natural gas and gasoline. As such, in the example, the combined natural gas and gasoline fuel may be used for a demand fraction less than 100 percent.

The present inventors disclose herein that good use may be made of a potentially significant amount of natural gas available at pressures between the cut off pressure and the minimum pressure. As used herein, the minimum pressure is the pressure in the natural gas container that will feed the engine with natural gas at a sufficient mass flow rate to keep the engine running and achieve the predetermined minimum output power of the engine. In examples with supplemental liquid fuel, the natural gas may be consumed to a very low pressure. The predetermined minimum output power of the engine is lower than the maximum output power of the engine. In an example, the maximum output power may be about 360 hp (horsepower) (268 kilowatts (kW)) and the predetermined minimum output power may be about 25 hp (18.6 kW). For a small, very efficient engine that idles at very low power, the minimum pressure may approach atmospheric pressure—for example under 1 psig. In examples with supplemental liquid fuel, the natural gas may be consumed at a pressure that would be insufficient to keep the engine running on natural gas alone. Therefore, in examples with supplemental liquid fuel, even a large engine may have a minimum pressure that approaches atmospheric pressure (zero gage pressure).

In an example, a suitable natural gas adsorbent may be included in the CNG tank in order to have even more natural gas available at low pressure. The adsorbed natural gas tank, with a suitable choice of adsorbent for the defined operating conditions, slowly releases/desorbs natural gas which can be used as a fuel for low engine demand, or during startup. It may be advantageous to use natural gas for engine cold starts, particularly during subfreezing temperatures in which hybrids may have lower functionality. It is to be understood that the rate of desorption of natural gas may be slower than the gas is consumed. Under such conditions, the pressure of natural gas in the natural gas container may fall when the natural gas is consumed at a greater rate than the desorption rate. The pressure of natural gas may rise during times in which the natural gas is not being consumed by the engine, or is being consumed more slowly than the desorption rate. In examples of the present disclosure, more natural gas from the tank may ultimately be consumed if the powertrain controller switches the engine back to the natural gas mode when the pressure recovers. The powertrain controller may have hysteresis in the control to prevent frequent switching in and out of the low power natural gas mode around the minimum pressure.

In an example of the present disclosure, the powertrain controller may respond to the fuel rail pressure, and switch from the alternate power to natural gas power depending on the demand placed on the powertrain. Low power demand driving conditions may be, for example, stopping at traffic lights, idle position, start-up, traffic jams, etc.

In an example, low pressure may range from about atmospheric pressure (about 14.7 psi) to about 400 psi; or in another example, from about 70 psi to about 150 psi.

The present disclosure advantageously increases vehicle driving range. Further, using natural gas reduces vehicle emissions. The present disclosure may be advantageous to hybrid electric vehicles where starting the vehicles on the battery could be difficult during subfreezing conditions.

Examples of the present disclosure advantageously provide flexibility of use while maintaining or improving vehicle performance in bi/multi-fuel or hybrid battery/natural gas vehicles.

As used herein, the term module or controller may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term code, as used herein, may include software, firmware, and/or microcode, and may refer to programs, routines, functions, classes, and/or objects. The term shared, as used herein, means that some or all code from multiple modules may be executed using a single (shared) processor. In addition, some or all code from multiple modules may be stored by a single (shared) memory. The term group, as used herein, means that some or all code from a single module may be executed using a group of processors. In addition, some or all code from a single module may be stored using a group of memories.

The apparatuses and methods described herein may be implemented by one or more computer programs executed by one or more processors. The computer programs include processor-executable instructions that are stored on a non-transitory, tangible computer readable medium. The computer programs may also include stored data. Some examples of the non-transitory, tangible computer readable medium include nonvolatile memory, magnetic storage, optical storage, etc.

In an example, a bi-fuel/multi-fuel vehicle engine system may include two or more fuel injection systems. A first fuel injection system may inject a first fuel into ports associated with combustion chambers of an engine. The first fuel may alternatively be directly injected into the combustion chamber rather than using port injection. The first fuel may be a gaseous fuel, such as compressed natural gas (CNG), liquefied petroleum gas (LPG), hydrogen, or another suitable type of fuel. A second fuel injection system may directly inject a second fuel into the combustion chambers. The second fuel may be a liquid fuel, such as gasoline or diesel fuel, or another suitable type of fuel. The powertrain controller (referred to above) controls the amount and timing of injections of the first and second fuels. The IC engines of the present disclosure may be normally aspirated, or may have a supercharger, turbocharger, or combinations thereof. The fuel injection systems are appropriately selected for compatibility with the pressure and flow requirements of the engine.

In another example of the present disclosure, a natural gas engine may be combined with a battery powered electric motor. By operating using the method disclosed herein, less of the stored natural gas remains unused. Therefore, the driving range of an IC engine/battery electric hybrid may be increased. The IC engine in the disclosed hybrid may run only on natural gas, or it may be a bi/multi-fuel engine.

In an example of the present disclosure, when natural gas levels in the natural gas container have been depleted to a point where the vehicle is primarily running on electric power, the IC engine may be simultaneously engaged at a lower power to provide a boost to supplement the electric motor. For example, the IC engine may be operated to provide a boost of about 15 hp to the powertrain during acceleration to improve the acceleration over operating with the electric motor alone.

TABLE 1

A 105 L tank with different service pressures, cut off pressures and filled with adsorbent

| Service pressure (psi) | Cut off pressure (psi) | Adsorbent in tank? | Available GGE (gasoline gallon equivalent) |
| --- | --- | --- | --- |
| 3,600 | 400 | No | 7.8 |
| 3,600 | 30 | No | 8.6 |
| 750 | 400 | No | 0.8 |
| 750 | 30 | No | 1.6 |
| 750 | 30 | Yes | >3 |

Natural gas vehicles are fitted with on-board storage tanks. Some natural gas storage tanks are designated low pressure systems, and these systems are rated for pressures up to about 750 psi. In an example, the low pressure systems are rated for pressures of about 725 psi and lower. During fueling, the container of the low pressure system storage tank is designed to fill until the tank achieves a pressure within the rated range. Other natural gas storage tanks are designated high pressure systems, and these systems are rated for pressures ranging from about 3,000 psi to about 3,600 psi. Similar to low pressure system storage tanks, the container of the high pressure system storage tank is designed to fill until the tank achieves a pressure within the rated range.

Both high and low pressure systems may utilize adsorbed natural gas, where a natural gas adsorbent is loaded into a container. The adsorbent may increase the storage capacity so that the tank is capable of storing and delivering a sufficient amount of natural gas for desired vehicle operation when filled to the rated pressures.

As noted above, the CNG tank/container used in examples disclosed herein may or may not include an adsorbent. If desired, Adsorbed Natural Gas (ANG) technology may be used in conjunction with the control module algorithm to increase the density of natural gas available in the CNG fuel tank for low engine demands.

Suitable adsorbents are at least capable of releasably retaining methane (i.e., reversibly storing or adsorbing and desorbing methane molecules). In some examples, the selected adsorbent may also be capable of reversibly storing other components found in natural gas, such as other hydrocarbons (e.g., ethane, propane, hexane, etc.), hydrogen gas, carbon monoxide, carbon dioxide, nitrogen gas, and/or hydrogen sulfide. In still other examples, the selected adsorbent may be inert to some of the natural gas components and capable of releasably retaining other of the natural gas components. As used herein, natural gas means a hydrocarbon gas mixture including predominately methane. Natural gas may include varying amounts of other higher alkanes and smaller amounts of carbon dioxide, nitrogen, and hydrogen sulfide. In an example, natural gas components by mass fraction may be about: methane 81.55%, ethane 6.79%, propane 4.98%, hexane 0.97%, hydrogen 0.01%, carbon monoxide 0.16%, and inert gases (nitrogen) 5.4%. The amount of methane in natural gas may vary, depending on the source. In another example, natural gas components by mass may be about: methane 75%, ethane 15%, and other hydrocarbons about 5%.

Examples of suitable natural gas adsorbents include carbon (e.g., activated carbons, super-activated carbon, carbon nanotubes, carbon nanofibers, carbon molecular sieves, zeolite templated carbons, etc.), zeolites, metal-organic framework (MOF) materials, porous polymer networks (e.g., PAF-1 or PPN-4), and combinations thereof. Examples of suitable zeolites include zeolite X, zeolite Y, zeolite LSX, MCM-41 zeolites, silicoaluminophosphates (SAPOs), and combinations thereof. Examples of suitable metal-organic frameworks include MOF-5, MOF-8, MOF-177, and/or the like, which are constructed by linking tetrahedral clusters with organic linkers (e.g., carboxylate linkers).

The volume that the adsorbent occupies in the CNG tank/container will depend upon the density of the adsorbent. The density of the adsorbent depends on the shaping and packing of the adsorbent in the CNG tank/container. In an example, it is desirable that the density of the adsorbent range from about 0.1 g/cc to about 0.9 g/cc. A well packed adsorbent may have a density of about 0.5 g/cc.

The adsorbent selected (i.e., type, density, etc.) may also depend upon the operation conditions (e.g., temperature, pressure, etc.).

Figure 1A:
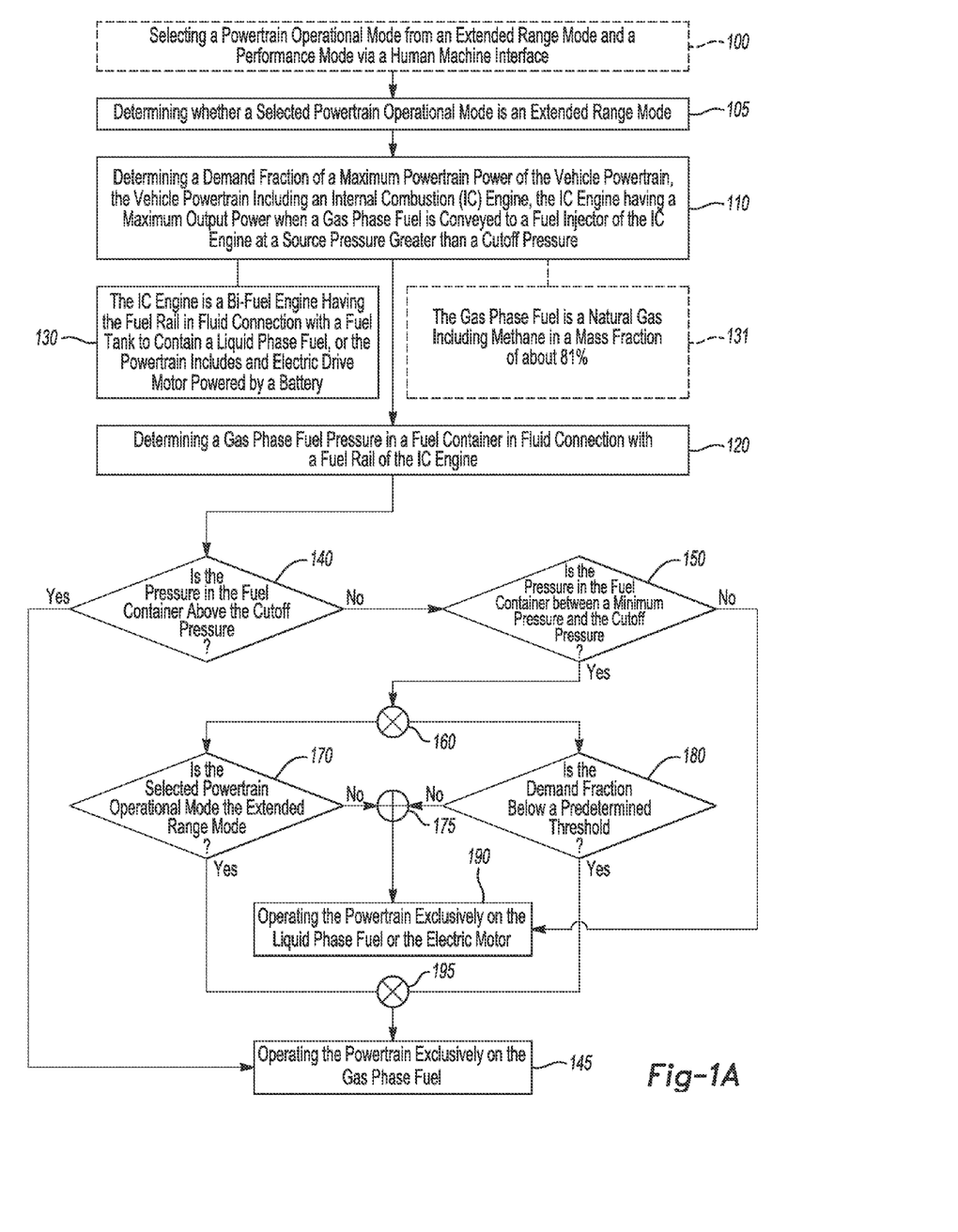
FIGS. 1A-1C together are a flow chart depicting an example of a method of operating a vehicle powertrain according to the present disclosure.
Figure 1B:
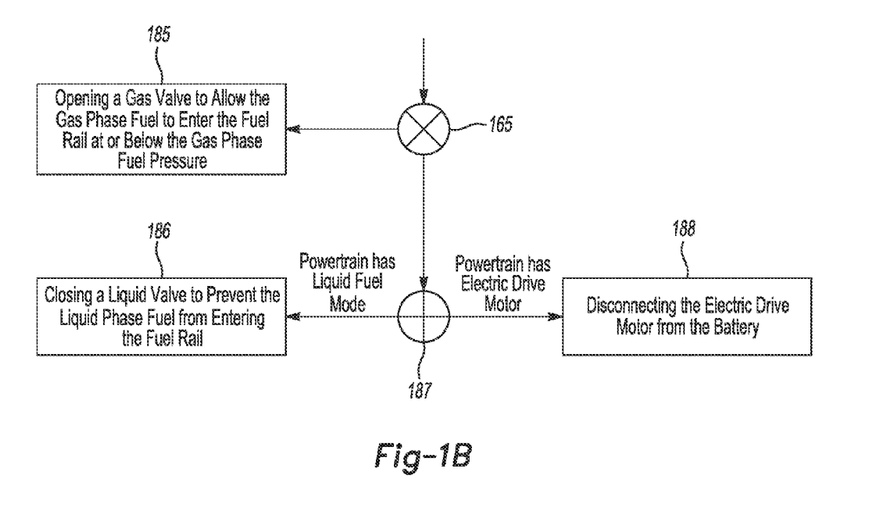
Figure 1C:
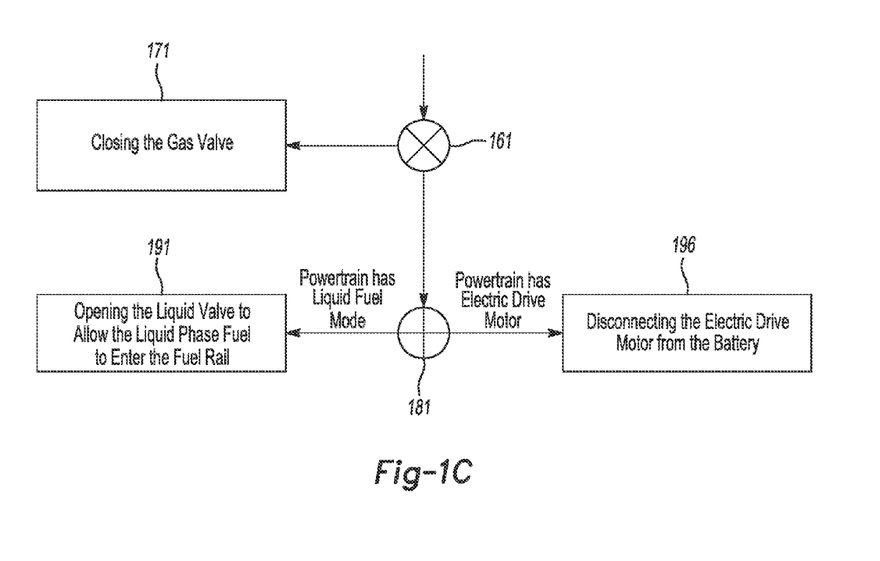

Referring now to FIGS. 1A-1C together, there is depicted a flow chart illustrating an example of a method of operating a vehicle powertrain according to the present disclosure. At 100, the step of selecting a powertrain operational mode from an extended range mode and a performance mode via a human machine interface is depicted in a block with dashed borders. The dashed borders indicate that step 100 is an optional step in the method. As used herein, the extended range mode is a selectable mode of operating a powertrain in which the powertrain uses a gas phase fuel at a pressure below a cutoff pressure. Some existing methods of operating vehicle powertrains prevent the vehicle from operating when the gas phase fuel is below the cutoff pressure. The extended range mode may also be called an economy mode, a first mode, or any other name that distinguishes the mode of operating the powertrain with the gas phase fuel below the cutoff pressure as disclosed herein from other modes of operating the vehicle powertrain.

As used herein, a "human machine interface" means a device to receive and implement control instructions from a live person. Examples of human machine interfaces are electrical toggle buttons and switches, as well as switches that may be operated by voice control, or via a graphical user interface. In an example, a driver may select an extended range mode via a button on an instrument panel of a vehicle. The selection of the extended range mode may be preprogrammed into the vehicle to operate as a default mode that may be overridden via the human machine interface. The vehicle may provide feedback to the driver to inform the driver that the extended range mode has been selected. For example, a programmable display on the instrument panel may indicate the powertrain operational mode. The vehicle may provide the feedback to the driver audibly or by a haptic indicator.

As depicted at 105, the method includes determining whether a selected powertrain operational mode is an extended range mode. According to the present disclosure, operating the powertrain exclusively on the gas phase fuel as depicted in FIG. 1A at 145 may include the steps depicted in FIG. 1B. As depicted at 110, the method includes determining a demand fraction of a maximum powertrain power of the vehicle powertrain including an internal combustion (IC) engine, the IC engine having a maximum output power when a gas phase fuel is conveyed to a gas fuel injector of the IC engine at a source pressure greater than a cutoff pressure. As used herein, the demand fraction of the maximum powertrain power of the vehicle powertrain means the demand fraction of the maximum power of the entire powertrain. In some examples, the powertrain may have more than one powerplant connected to the drivetrain that may be engaged simultaneously. For example, a natural gas powered IC engine may have a maximum output power of 200 hp; and an electric motor may have a maximum output power of 100 hp. The natural gas powered IC engine and the electric motor can be engaged simultaneously to yield a maximum powertrain power of 300 hp.

In another example, the powertrain is alternatively powered by either a natural gas powered IC engine with a maximum output power of 200 hp or an electric motor having a maximum output power of 100 hp. When full power is demanded from such an example, the powertrain controller will command 200 hp.

The demand fraction, is dimensionless and may be expressed as a percentage. For example, when full power is demanded from the powertrain, the demand fraction is 100 percent. Demand fraction may be roughly translated to percentage of accelerator pedal travel. If the accelerator pedal is not depressed, the demand fraction may be relatively low, for example, between 0 and 5 percent.

In an example, the demand fraction may be indicative of a human operator's input, for example by depressing an accelerator pedal. However, examples of the present disclosure may be implemented in a vehicle that does not have a human operator, or where certain operations of the vehicle are automated. For example, when starting the vehicle or running the vehicle at idle, the powertrain control system may be in a fully automated mode that sets the demand fraction without human operator intervention.

At 120, FIG. 1A depicts determining a gas phase fuel pressure in a fuel container in fluid connection with a fuel rail of the IC engine. The fuel rail of the IC engine may be, for example, a hollow, tubular pressurizable container with one or more gas fuel injectors connected to allow each of the gas fuel injectors to receive the gas phase fuel at about the same pressure. The gas phase fuel pressure may be measured with a pressure gage, or may be determined based on calculations For example, the stress on the walls of the gas phase fuel container may be indicative of the pressure in the container. The gas phase fuel tubes that lead to the IC engine from the gas phase fuel container may be sized to minimize the pressure drop at the highest flow rates. Therefore, the pressure at the gas phase fuel container may be about the same as the pressure at the input to the gas fuel injector connected to the fuel rail. In an example, a regulator may be placed between the gas phase fuel container and the gas phase fuel rail to reduce the pressure in the gas phase fuel tubes. For example, the gas phase fuel may be natural gas. In the example, the pressure in a 3600 psi natural gas container may be reduced by a regulator to a range of about 110 psi to about 150 psi in the natural gas fuel tube that leads to the IC engine. When the gas container pressure is below the regulated pressure, the regulator is open to allow a free flow of the gas phase fuel to the engine. Although the pressure may be limited by a regulator, examples of the present disclosure do not include a compressor or pump onboard the vehicle to raise the pressure of the gas phase fuel that is delivered to the gas fuel injector.

At 130, FIG. 1A shows that the IC engine is a bi-fuel engine having the fuel rail in fluid connection with a fuel tank to contain a liquid phase fuel, or the powertrain includes an electric drive motor powered by a battery. At 131, FIG. 1A shows that in a block with a dashed outline that in some examples of the present disclosure, the gas phase fuel is a natural gas including methane in a mass fraction of about 81 percent. At 140, FIG. 1A has a conditional block that determines if the pressure in the fuel container is above the cutoff pressure. If the answer to block 140 is "yes", then at block 145, the method includes operating the powertrain exclusively on the gas phase fuel. If the answer to block 140 is "no" then at conditional block 150, the method determines if the pressure in the fuel container is between a minimum pressure and the cutoff pressure. If the answer to block 150 is yes, then, at block 160, FIG. 1A depicts an "and" function, which means that both conditional block 170 and conditional block 180 are executed in response to an answer of "yes" to conditional block 150. At conditional block 170, the method determines if the selected powertrain operational mode is the extended range mode. At conditional block 180, the method determines if the demand fraction is below a predetermined threshold. The "and" function at reference numeral 195 indicates that if the answers to both block 170 and block 180 are "yes" then the method will continue with operating the powertrain exclusively on the gas phase fuel at block 145. The "or" function at reference numeral 175 indicates that if the answer to either block 170 or block 180 are no, then the method will continue with operating the powertrain exclusively on the liquid phase fuel or the electric motor at block 190. FIG. 1A also shows that block 190 will be executed if the answer to conditional block 150 is "no".

In the example depicted in FIG. 1A, the method includes operating the powertrain exclusively on the gas phase fuel if i) the pressure in the fuel container is above the cutoff pressure or ii) the pressure in the fuel container is between a minimum pressure and the cutoff pressure, the selected powertrain operational mode is the extended range mode, and the demand fraction is below a predetermined threshold. The method includes operating the powertrain exclusively on the liquid phase fuel or the electric motor if i) the pressure in the fuel container is below the minimum pressure, or ii) the pressure in the fuel container is between the minimum pressure and the cutoff pressure, and the selected powertrain operational mode is not the extended range mode, or the demand fraction is greater than or equal to the predetermined threshold.

According to the present disclosure, operating the powertrain exclusively on the gas phase fuel as depicted in FIG. 1A at 145 may include the steps depicted in FIG. 1B. At 185, FIG. 1B depicts opening a gas valve to allow the gas phase fuel to enter the fuel rail at or below the gas phase fuel pressure. At 165, FIG. 1B depicts an "and" function, which means that both 185, and 180 are executed. Reference numeral 180 depicts an "or" function, which means that either 190, or 195 are executed. If the powertrain has a liquid fuel mode, then 186 is executed: closing a liquid valve to prevent the liquid phase fuel from entering the fuel rail. If the powertrain has an electric drive motor, then 188 is executed: disconnecting the electric drive motor from the battery.

According to the present disclosure, operating the powertrain exclusively on the liquid phase fuel or the electric motor as depicted in FIG. 1A at 190 may include the steps depicted in FIG. 1C. At 161, FIG. 1C depicts an "and" function, which means that both 171, closing the gas valve, and 181 are executed. Reference numeral 181 depicts an "or" function, which means that either 191, or 196 are executed. If the powertrain has a liquid fuel mode, then 191 is executed: opening the liquid valve to allow the liquid phase fuel to enter the fuel rail. If the powertrain has an electric drive motor, then 196 is executed: using the battery to power the electric drive motor.

Figure 2A:
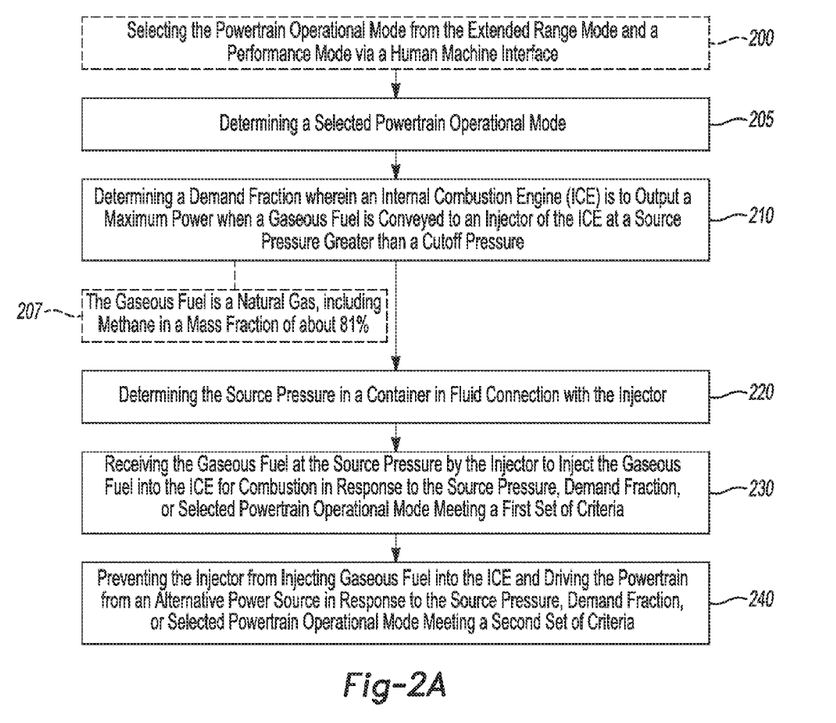
FIG. 2A is a flow chart depicting another example of a method of operating a vehicle powertrain according to the present disclosure.

FIG. 2A is a flow chart depicting another example of a method of operating a vehicle powertrain according to the present disclosure. As depicted at 205, the method includes determining a selected powertrain operational mode. As depicted at 210, the method includes determining a demand fraction wherein an internal combustion engine (ICE) is to output a maximum power when a gaseous fuel is conveyed to an injector of the ICE at a source pressure greater than a cutoff pressure.

At 220, FIG. 2A depicts determining the source pressure in a container in fluid connection with the injector. At 230, FIG. 2A depicts receiving the gaseous fuel at the source pressure by the injector to inject the gaseous fuel into the ICE for combustion in response to the source pressure, demand fraction, or selected powertrain operation mode meeting a first set of criteria. At 240, FIG. 2A depicts preventing the injector from injecting the gas phase fuel into the ICE and driving the powertrain from an alternative power source in response to the source pressure, demand fraction, or selected powertrain operation mode meeting a second set of criteria.

Figure 2B:
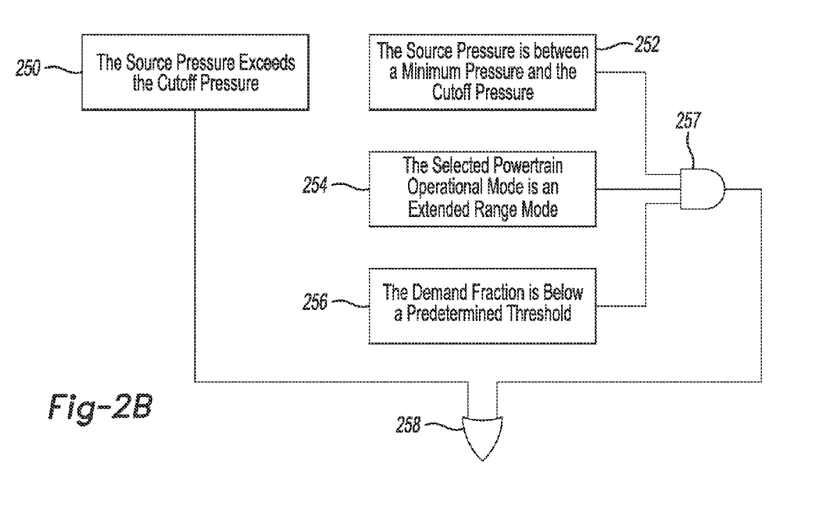
FIG. 2B is a flow chart showing a first set of criteria as depicted in FIG. 2A.

FIG. 2B depicts an example of the first set of criteria depicted in step 230 of FIG. 2A. The criterion depicted at block 250 is "the source pressure exceeds the cutoff pressure". The criterion depicted at block 252 is "the source pressure is between a minimum pressure and the cutoff pressure". The criterion depicted at 254 is "the selected powertrain operational mode is an extended range mode". The criterion depicted at 256 is "the demand fraction is below a predetermined threshold." The logic gate at 257 is an "and" gate. The logic gate at 258 is an "or" gate. The set of criteria shown in FIG. 2B is met when 250 is true or 252, 254 and 256 are true.

Figure 2C:
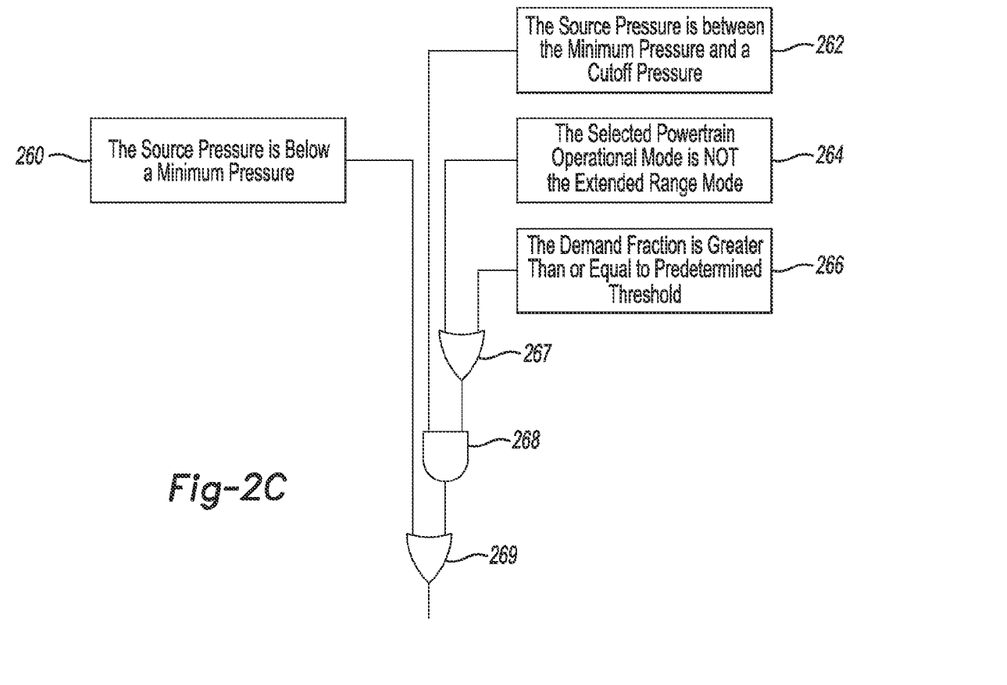
FIG. 2C is a flow chart showing a second set of criteria as depicted in FIG. 2A.

FIG. 2C depicts an example of the second set of criteria as depicted in step 240 of FIG. 2A. The criterion depicted at block 260 is "the source pressure is below a minimum pressure". The criterion depicted at block 262 is "the source pressure is between the minimum pressure and a cutoff pressure". The criterion depicted at 264 is "the selected powertrain operational mode is NOT an extended range mode". The criterion depicted at 266 is "the demand fraction is greater than or equal to the predetermined threshold." The logic gate at 267 is an "or" gate. The logic gate at 268 is an "and" gate. The logic gate at 269 is an "or" gate. The set of criteria shown in FIG. 2C is met when 260 is true or 262 and 264 or 256 are true.

Figure 2D:
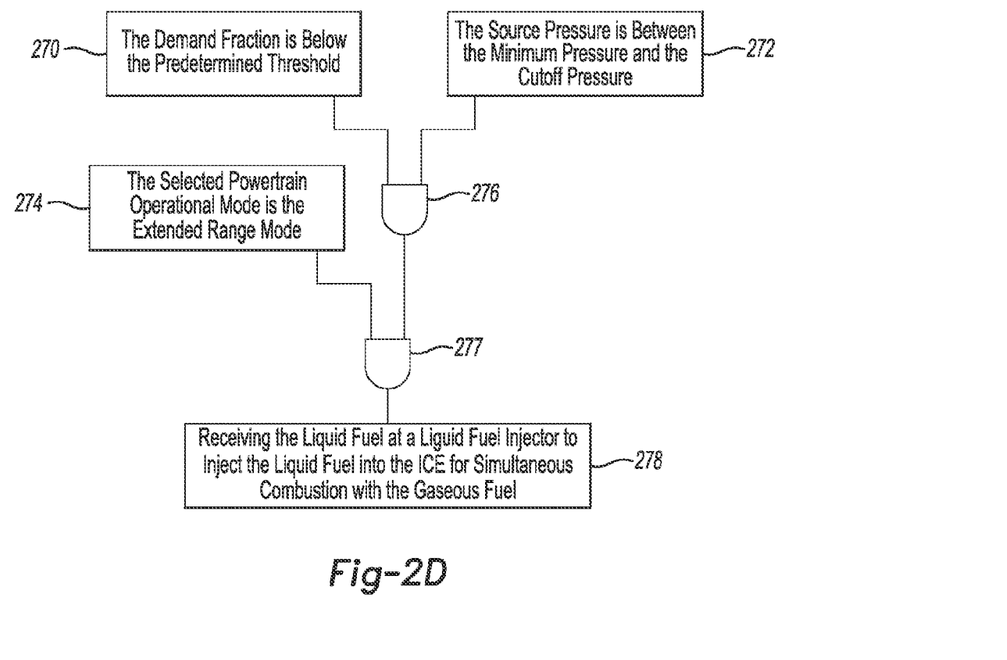
FIG. 2D is a flow chart that depicts an additional step to add to the method depicted in FIGS. 2A-2C that may be included when the alternative power source is the ICE utilizing a liquid fuel.
Figure 3:
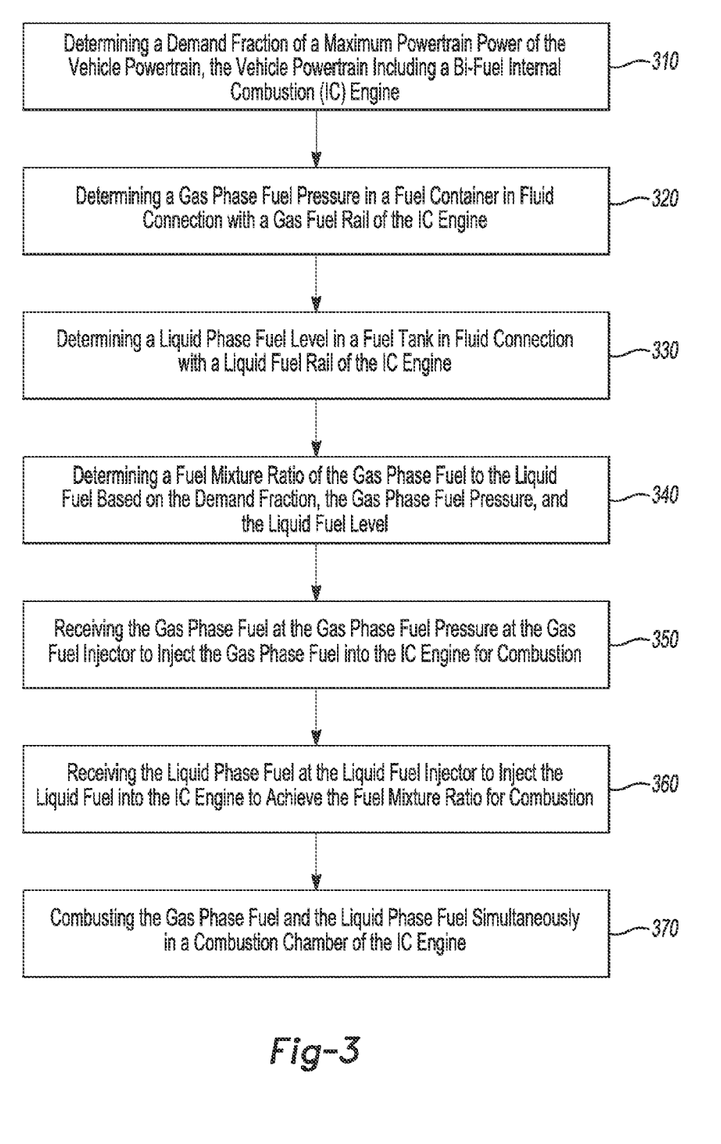
FIG. 3 is a flow chart depicting yet another example of a method of operating a vehicle powertrain according to the present disclosure.

FIG. 2D depicts additional steps of the method depicted in FIG. 2A-2C that may be included when the alternative power source is the ICE utilizing a liquid fuel. The criterion depicted at 270 is "the demand fraction is below the predetermined threshold." The criterion depicted at 272 is "the source pressure is between the minimum pressure and the cutoff pressure." The criterion depicted at 274 is "the selected powertrain operational mode is the extended range mode." The logic gates at 276 and 277 are both "and" gates. As shown in FIG. 2D, if 270, 272, and 274 are all true, then the method executes step 278. FIG. 2D depicts step 278 as "receiving the liquid fuel at a liquid fuel injector to inject the liquid fuel into the ICE for simultaneous combustion with the gaseous fuel."

Figure 4:
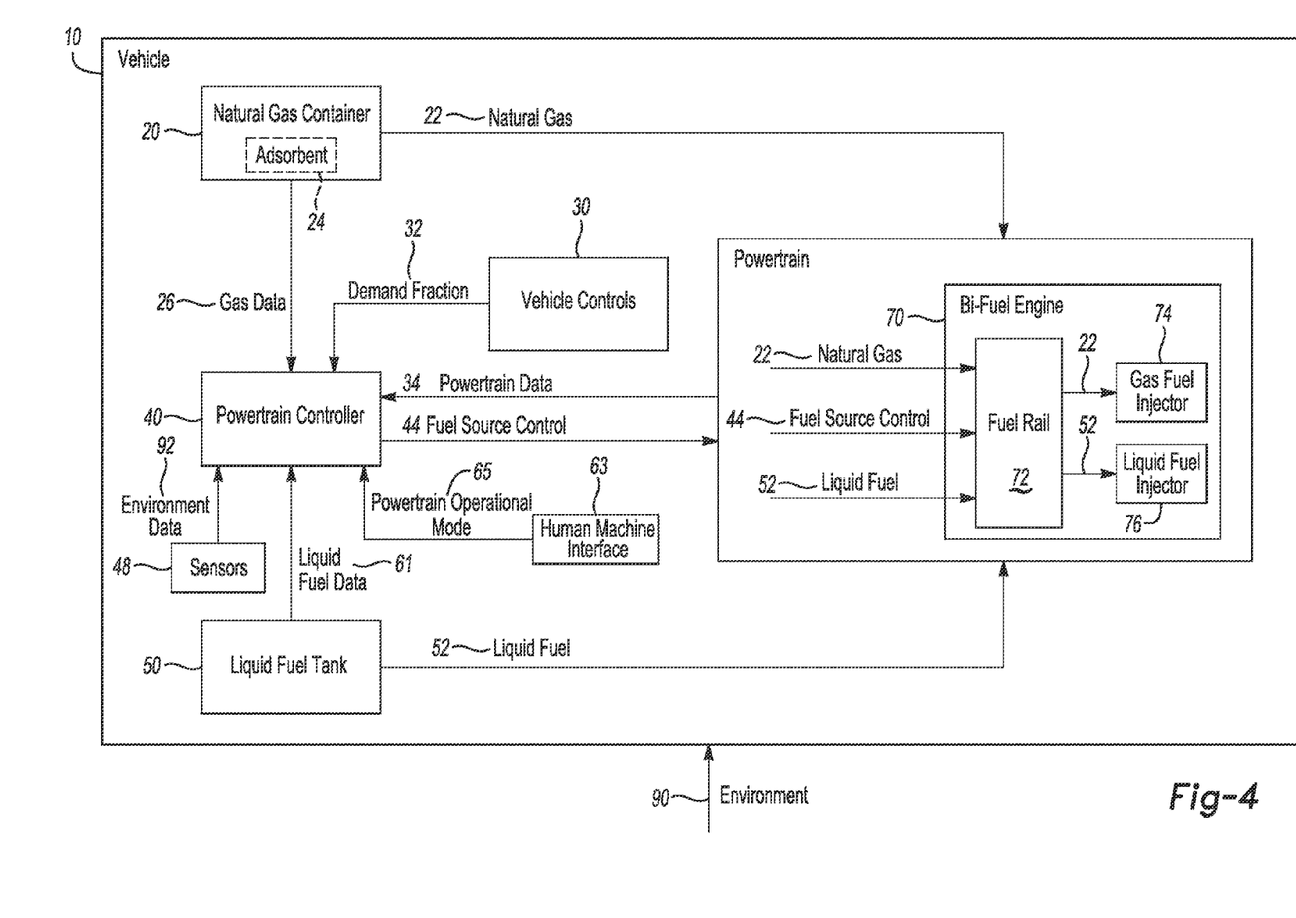
FIG. 4 is a system block diagram depicting an example of a vehicle having a powertrain with a bi-fuel engine to be operated by a method according to the present disclosure.

FIG. 4 is a system block diagram depicting an example of a vehicle having a powertrain with a bi-fuel engine to be operated by a method according to the present disclosure. A vehicle 10 is depicted in an environment 90. The vehicle has sensors 48 that provide environmental data 92 to the powertrain controller 40. Examples of the environmental data 92 include ambient air pressure, temperature, and humidity. The vehicle 10 has a natural gas container 20. The natural gas container 20 may have adsorbent 24 inside the container 20. The adsorbent 24 is shown in dashed line to indicate that in some examples, there may be no adsorbent 24. The natural gas container 20 sends natural gas 22 to the powertrain 60. Gas Data 26 about the natural gas 22 in the container 20 is sent to the powertrain controller 40. The vehicle 10 has a liquid fuel tank 50. The liquid fuel tank 50 sends liquid fuel 52 to the powertrain 60. Liquid fuel data 61 about the liquid fuel 52 in the tank 50 (for example, fuel level) is sent to the powertrain controller 40. The powertrain 60 sends powertrain data 34 to the powertrain controller 40. Examples of powertrain data 34 include any data from the engine used to control the engine. For example, engine speed and temperature. The powertrain 60 includes a bi-fuel engine 70. The bi-fuel engine 70 depicted in FIG. 4 has a gas fuel injector 74 and a liquid fuel injector 76. Both the gas fuel injector 74 and the liquid fuel injector 76 share the same fuel rail 72. The powertrain controller sends the fuel source control 44 to select which fuel, natural gas 22, or liquid fuel 52 gets sent into the fuel rail 72. The vehicle controls 30 provide the demand fraction 32 to the powertrain controller 40. The Human Machine Interface 63 provides the powertrain operational mode 65 to the powertrain controller 40.

Figure 5:
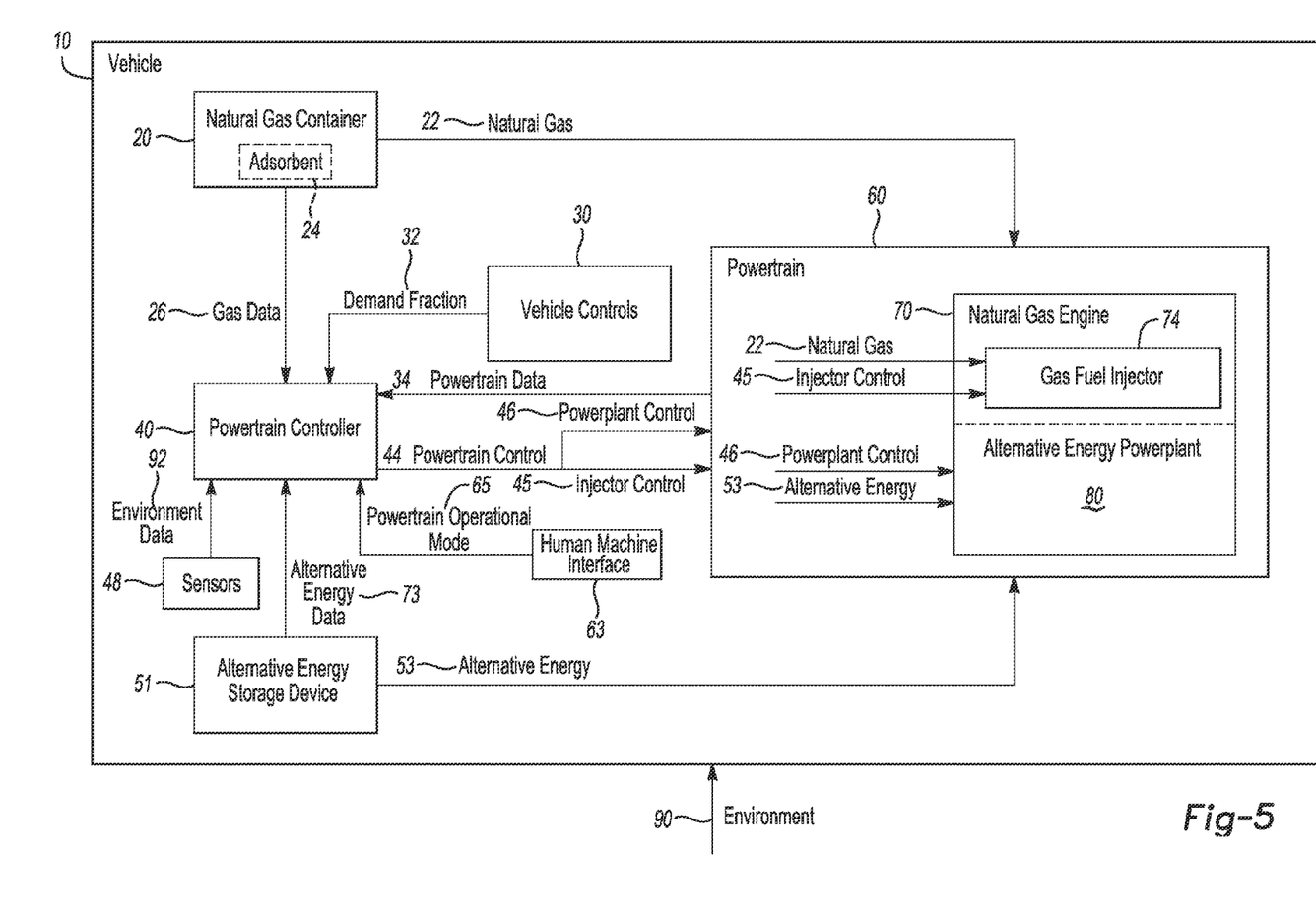
FIG. 5 is a system block diagram depicting an example of a vehicle having a powertrain including a natural gas engine to be operated by a method according to the present disclosure.

FIG. 5 is a system block diagram depicting an example of a vehicle having a powertrain including a natural gas engine to be operated by a method according to the present disclosure. A vehicle 10 is depicted in an environment 90. The vehicle has sensors 48 that provide environmental data 92 to the powertrain controller 40. Examples of the environmental data 92 include ambient air pressure, temperature, and humidity. The vehicle 10 has a natural gas container 20. The natural gas container 20 may have adsorbent 24 inside the container 20. The adsorbent 24 is shown in dashed line to indicate that in some examples, there may be no adsorbent 24. The natural gas container 20 sends natural gas 22 to the powertrain 60. Gas Data 26 about the natural gas 22 in the container 20 is sent to the powertrain controller 40. The vehicle 10 has an alternative energy storage device 51.

As used herein, "alternative energy" means an alternative to natural gas. This may be different from a common usage of the term meaning an alternative to gasoline. As such, as used herein, the alternative energy stored in the alternative energy storage device 51 may be, for example, gasoline, diesel, ethanol, bio-diesel, or electric charge. The storage device 51 may be a fuel tank, an electrochemical battery, or a storage capacitor. The alternative energy storage device 51 sends alternative energy 53 to the powertrain 60. Alternative energy data 73 about the alternative energy 53 stored in the alternative energy storage device 51 (for example, fuel level or state of charge of the battery) is sent to the powertrain controller 40. The powertrain 60 sends powertrain data 34 to the powertrain controller 40. Examples of powertrain data 34 include any data from the engine used to control the engine. For example, engine speed and temperature. The powertrain 60 includes a natural gas engine 70. The natural gas engine 70 depicted in FIG. 5 has a gas fuel injector 74. The powertrain controller sends the injector control 45 to control the injection of natural gas 22 into the natural gas engine 70. The powertrain also includes an alternative energy powerplant 80. The alternative energy powerplant 80 may be, for example, an electric motor. (See also FIG. 7.) The alternative energy powerplant 80 may be an IC engine distinct from the natural gas engine 70. However, the dashed line between the natural gas engine 70 and the alternative energy powerplant 80 means that the natural gas engine 70 and the alternative energy powerplant may be the same engine operating in different modes. For example, the natural gas engine 70 may be a bi-fuel engine that has a natural gas operating mode and a flex-fuel operating mode. In the flex fuel mode, the bi-fuel engine runs on a variable blend of gasoline and ethanol. The powertrain control 44 includes the injector control 45 and the powerplant control 46 to control whether the engine runs on natural gas or the alternative energy 53 at any given time. The vehicle controls 30 provide the demand fraction 32 to the powertrain controller 40.

Figure 6:
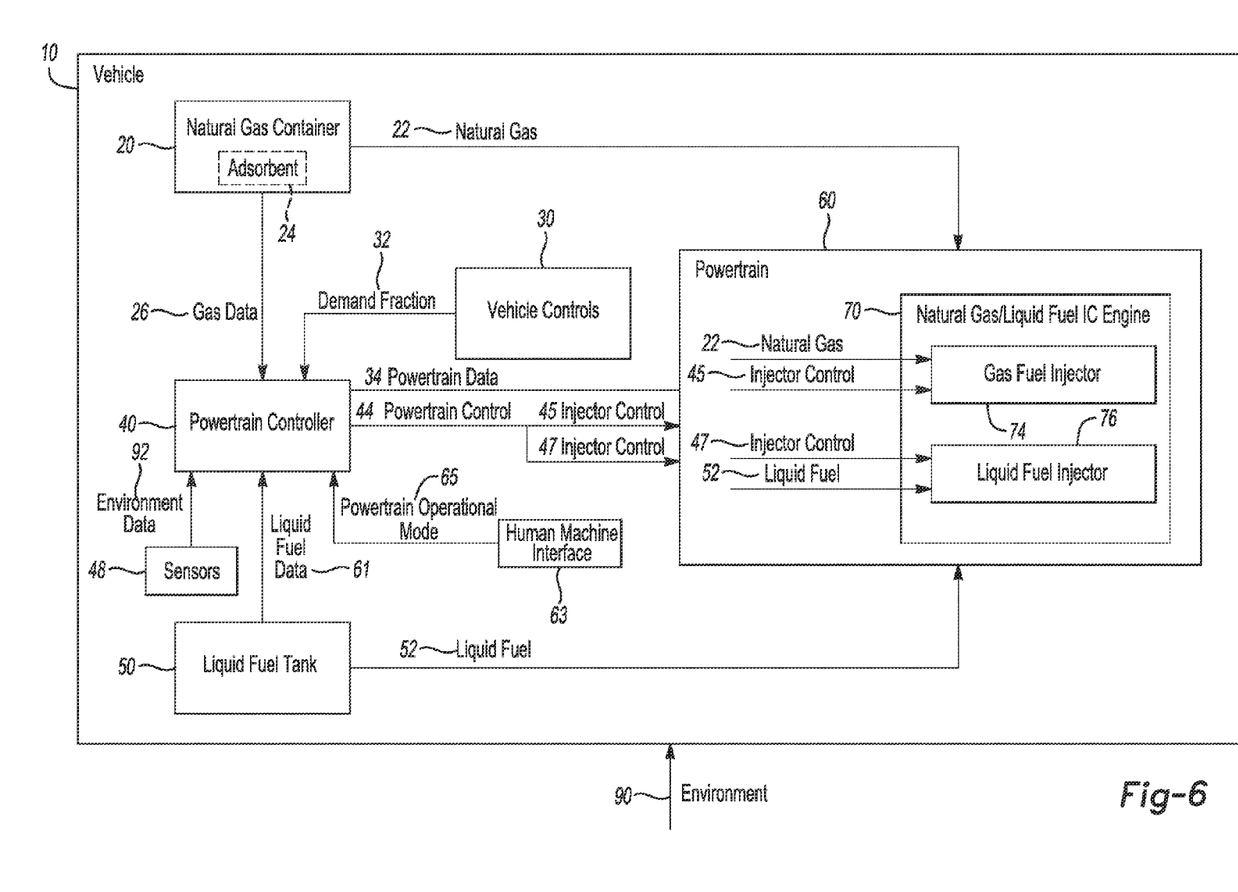
FIG. 6 is a system block diagram depicting an example of a vehicle having a powertrain including a natural gas and liquid fuel IC engine to be operated by a method according to the present disclosure.

FIG. 6 is a system block diagram depicting an example of a vehicle having a powertrain including a natural gas and liquid fuel IC engine to be operated by a method according to the present disclosure. A vehicle 10 is depicted in an environment 90. The vehicle has sensors 48 that provide environmental data 92 to the powertrain controller 40. Examples of the environmental data 92 include ambient air pressure, temperature, and humidity. The vehicle 10 has a natural gas container 20. The natural gas container 20 may have adsorbent 24 inside the container 20. The adsorbent 24 is shown in dashed line to indicate that in some examples, there may be no adsorbent 24. The natural gas container 20 sends natural gas 22 to the powertrain 60. Gas Data 26 about the natural gas 22 in the container 20 is sent to the powertrain controller 40. The vehicle 10 has a liquid fuel tank 50. The liquid fuel tank 50 sends liquid fuel 52 to the powertrain 60. Liquid fuel data 61 about the liquid fuel 52 stored in the liquid fuel tank 50 (for example, fuel level) is sent to the powertrain controller 40. The powertrain 60 sends powertrain data 34 to the powertrain controller 40. Examples of powertrain data 34 include any data from the engine used to control the engine. For example, engine speed and temperature. The powertrain 60 includes a natural gas/liquid fuel engine 70. The natural gas/liquid fuel engine 70 depicted in FIG. 6 has a gas fuel injector 74 and a liquid fuel injector 76. The powertrain controller sends the injector control 45 and 47 to control the injection of natural gas 22 and liquid fuel 52 into the natural gas/liquid fuel engine 70. The powertrain control 44 includes the injector controls 45 and 47 to control whether the engine runs on natural gas or the liquid fuel 52 at any given time. The vehicle controls 30 provide the demand fraction 32 to the powertrain controller 40.

Figure 7:
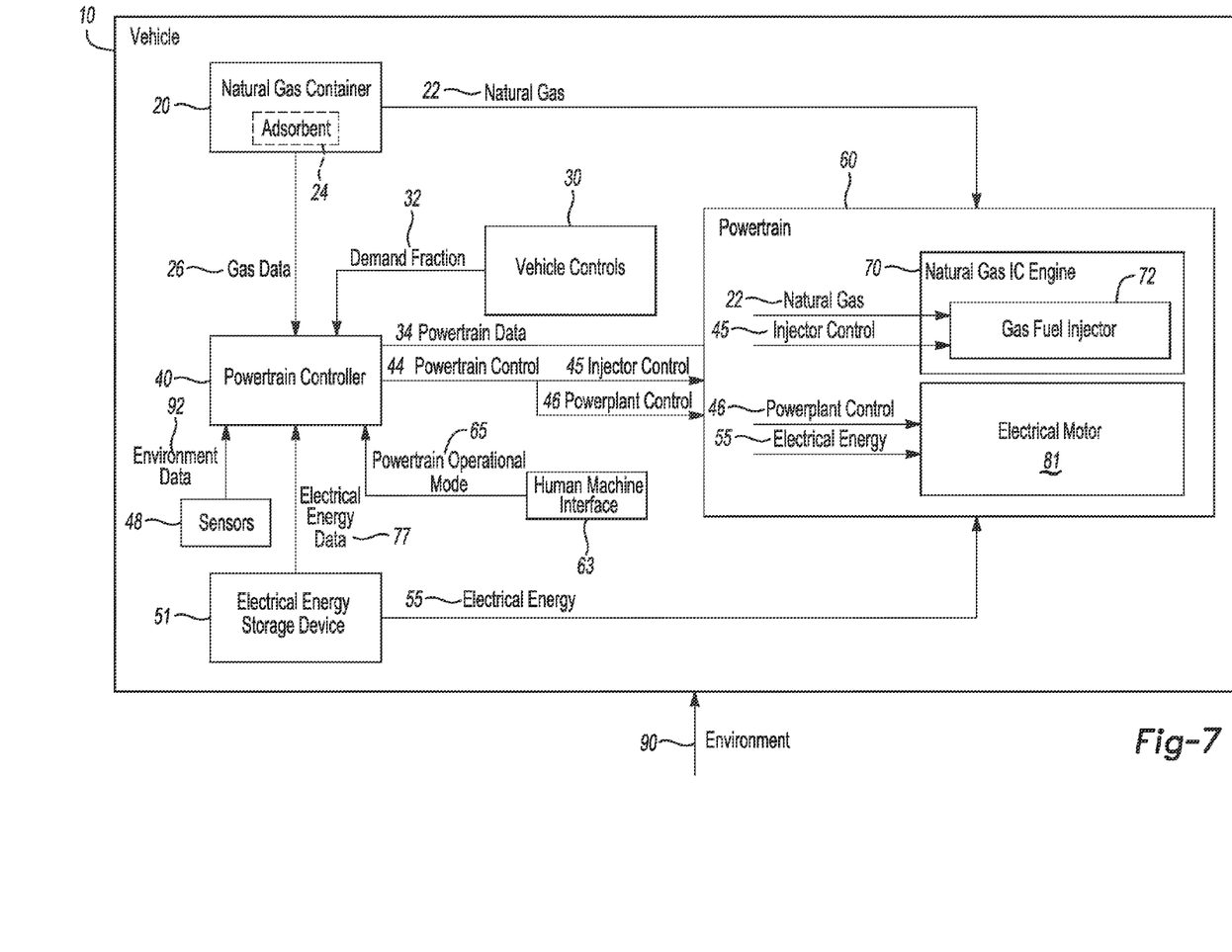
FIG. 7 is a system block diagram depicting an example of a vehicle having a powertrain including a natural gas engine and an electric motor to be operated by a method according to the present disclosure.

FIG. 7 is a system block diagram depicting an example of a vehicle having a powertrain including a natural gas engine and an electric motor to be operated by a method according to the present disclosure. A vehicle 10 is depicted in an environment 90. The vehicle has sensors 48 that provide environmental data 92 to the powertrain controller 40. Examples of the environmental data 92 include ambient air pressure, temperature, and humidity. The vehicle 10 has a natural gas container 20. The natural gas container 20 may have adsorbent 24 inside the container 20. The adsorbent 24 is shown in dashed line to indicate that in some examples, there may be no adsorbent 24. The natural gas container 20 sends natural gas 22 to the powertrain 60. Gas Data 26 about the natural gas 22 in the container 20 is sent to the powertrain controller 40. The vehicle 10 has an electrical energy storage device 51. The storage device 51 may be, for example, an electrochemical battery, or a storage capacitor. The electrical energy storage device 51 sends electrical energy 55 to the powertrain 60. Electrical energy data 77 about the electrical energy 55 stored in the electrical energy storage device 51 (for example, state of charge of the battery) is sent to the powertrain controller 40. The powertrain 60 sends powertrain data 34 to the powertrain controller 40. Examples of powertrain data 34 include any data from the engine used to control the engine. For example, engine speed and temperature. The powertrain 60 includes a natural gas engine 70. The natural gas engine 70 depicted in FIG. 5 has a gas fuel injector 74. The powertrain controller sends the injector control 45 to control the injection of natural gas 22 into the natural gas IC engine 70. The powertrain also includes an electric motor 81. The powertrain control 44 includes the injector control 45 and the powerplant control 46 to control whether the powertrain 60 runs on natural gas 22 or the electrical energy 55 at any given time. The powertrain 60 may run on both natural gas 22 and electrical energy 55 simultaneously. The vehicle controls 30 provide the demand fraction 32 to the powertrain controller 40.

It is to be understood that the ranges provided herein include the stated range and any value or sub-range within the stated range. For example, a range from about 14.7 psi to about 400 psi should be interpreted to include not only the explicitly recited limits of about 14.7 psi and about 400 psi, but also to include individual values, such as 40 psi, 95 psi, etc., and sub-ranges, such as from about 45 psi to about 200 psi, etc. Furthermore, when "about" is utilized to describe a value, this is meant to encompass minor variations (up to +/−10%) from the stated value.

In describing and claiming the examples disclosed herein, the singular forms "a", "an", and "the" include plural referents unless the context clearly dictates otherwise.

It is to be understood that the terms "connect/connected/connection" and/or the like are broadly defined herein to encompass a variety of divergent connected arrangements and assembly techniques. These arrangements and techniques include, but are not limited to (1) the direct communication between one component and another component with no intervening components therebetween; and (2) the communication of one component and another component with one or more components therebetween, provided that the one component being "connected to" the other component is somehow in operative communication with the other component (notwithstanding the presence of one or more additional components therebetween).

Furthermore, reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

Although the present disclosure has been described with reference to vehicles, it is to be understood that the disclosed method may be applied to static applications including, for example, IC engine-powered electric generators for providing electric power.

While several examples have been described in detail, it will be apparent to those skilled in the art that the disclosed examples may be modified. Therefore, the foregoing description is to be considered non-limiting.

What is claimed is:

1. A method of operating a vehicle powertrain, the method comprising:
   determining whether a selected powertrain operational mode is an extended range mode;
   determining a demand fraction of a maximum powertrain power of the vehicle powertrain, the vehicle powertrain including an internal combustion (IC) engine, the IC engine having a maximum output power when a gas phase fuel is conveyed to a fuel injector of the IC engine at a source pressure greater than a cutoff pressure;
   determining a gas phase fuel pressure in a fuel container in fluid connection with a fuel rail of the IC engine;
   operating the powertrain exclusively on the gas phase fuel if:
      the pressure in the fuel container is above the cutoff pressure; or
      the pressure in the fuel container is between a minimum pressure and the cutoff pressure;
      the selected powertrain operational mode is the extended range mode; and
      the demand fraction is below a predetermined threshold; and
   operating the powertrain exclusively on a liquid phase fuel or an electric drive motor if:
      the pressure in the fuel container is below the minimum pressure; or
      the pressure in the fuel container is between the minimum pressure and the cutoff pressure; and
      the selected powertrain operational mode is not the extended range mode; or
      the demand fraction is greater than or equal to the predetermined threshold
   wherein the IC engine is a bi-fuel engine having the fuel rail in fluid connection with a fuel tank to contain the liquid phase fuel, or the powertrain includes the electric drive motor powered by a battery.

2. The method as defined in claim 1 wherein:
   operating the powertrain exclusively on the gas phase fuel includes:
      opening a gas valve to allow the gas phase fuel to enter the fuel rail at or below the gas phase fuel pressure; and
      i) closing a liquid valve to prevent the liquid phase fuel from entering the fuel rail; or
      ii) disconnecting the electric drive motor from the battery; and
   operating the powertrain exclusively on the liquid phase fuel or the electric motor includes:
      closing the gas valve; and
      i) opening the liquid valve to allow the liquid phase fuel to enter the fuel rail; or
      ii) connecting the electric drive motor to the battery.

3. The method as defined in claim 1, further comprising selecting the powertrain operational mode from the extended range mode and a performance mode via a human machine interface.

4. The method as defined in claim 1 wherein the gas phase fuel is a natural gas including methane in a mass fraction of about 81 percent.

5. A method of operating a vehicle powertrain, the method comprising:
   determining a selected powertrain operational mode;
   determining a demand fraction wherein an internal combustion engine (ICE) is to output a maximum power when a gaseous fuel is conveyed to an injector of the ICE at a source pressure greater than a cutoff pressure;
   determining the source pressure in a container in fluid connection with the injector;
   receiving the gaseous fuel at the source pressure by the injector to inject the gaseous fuel into the ICE for combustion in response to the source pressure, demand fraction, or selected powertrain operation mode meeting a first set of criteria; and
   preventing the injector from injecting the gas phase fuel into the ICE and driving the powertrain from an alternative power source in response to the source pressure, demand fraction, or selected powertrain operation mode meeting a second set of criteria.

6. The method as defined in claim 5 wherein:
the first set of criteria includes:
- the source pressure exceeds the cutoff pressure; or
- the source pressure is between a minimum pressure and the cutoff pressure;
- the selected powertrain operational mode is an extended range mode; and
- the demand fraction is below a predetermined threshold; and the second set of criteria includes:
- the source pressure is below the minimum pressure; or
- the source pressure is between the minimum pressure and the cutoff pressure; and
- the selected powertrain operational mode is not the extended range mode; or
- the demand fraction is greater than or equal to the predetermined threshold.

7. The method as defined in claim 6, further comprising selecting the powertrain operational mode from the extended range mode and a performance mode via a human machine interface.

8. The method as defined in claim 6 wherein the gaseous fuel is a natural gas including methane in a mass fraction of about 81 percent.

9. The method as defined in claim 6 wherein the alternative power source is the ICE utilizing a liquid fuel.

10. The method as defined in claim 9, further comprising:
receiving the liquid fuel at a liquid fuel injector to inject the liquid fuel into the ICE for simultaneous combustion with the gaseous fuel if:
- the demand fraction is below the predetermined threshold;
- the source pressure is between the minimum pressure and the cutoff pressure; and
- the selected powertrain operational mode is the extended range mode.

11. The method as defined in claim 6 wherein the alternative power source is an electric motor.

12. The method as defined in claim 6 wherein the predetermined threshold is 10 percent of a maximum powertrain power of the vehicle powertrain.

13. The method as defined in claim 6 wherein the demand fraction corresponding to starting the ICE is below the predetermined threshold.

14. A method of operating a vehicle powertrain, the method comprising:
selecting a powertrain operational mode from an extended range mode and a performance mode;
determining whether the selected powertrain operational mode is the extended range mode;
determining a demand fraction of a maximum powertrain power of the vehicle powertrain, the vehicle powertrain including an internal combustion (IC) engine, the IC engine having a maximum output power when a gas phase fuel is conveyed to a fuel injector of the IC engine at a source pressure greater than a cutoff pressure;
determining a gas phase fuel pressure in a fuel container in fluid connection with a fuel rail of the IC engine;
operating the powertrain exclusively on the gas phase fuel if:
- the pressure in the fuel container is above the cutoff pressure; or
- the pressure in the fuel container is between a minimum pressure and the cutoff pressure;
- the selected powertrain operational mode is the extended range mode; and
- the demand fraction is below a predetermined threshold; and operating the powertrain exclusively on the a liquid phase fuel or the an electric drive motor if:
- the pressure in the fuel container is below the minimum pressure; or
- the pressure in the fuel container is between the minimum pressure and the cutoff pressure; and
- the selected powertrain operational mode is not the extended range mode; or
- the demand fraction is greater than or equal to the predetermined threshold wherein the IC engine is a bi-fuel engine having the fuel rail in fluid connection with a fuel tank to contain the liquid phase fuel, or the powertrain includes the electric drive motor powered by a battery.

\* \* \* \* \*